(12) United States Patent
Shin

(10) Patent No.: US 12,191,659 B2
(45) Date of Patent: Jan. 7, 2025

(54) METHOD FOR CONTROLLING ENERGY STORAGE SYSTEM AND DEVICES PERFORMING METHOD

(71) Applicant: ELECTRONICS AND TELECOMMUNICATIONS RESEARCH INSTITUTE, Daejeon (KR)

(72) Inventor: Cheol-Ho Shin, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 339 days.

(21) Appl. No.: 17/713,088

(22) Filed: Apr. 4, 2022

(65) Prior Publication Data
US 2022/0360107 A1 Nov. 10, 2022

(30) Foreign Application Priority Data

May 10, 2021 (KR) .................. 10-2021-0060141
Jan. 3, 2022 (KR) .................. 10-2022-0000248

(51) Int. Cl.
*H02J 13/00* (2006.01)
*H02J 3/38* (2006.01)

(52) U.S. Cl.
CPC ........ *H02J 13/00022* (2020.01); *H02J 3/381* (2013.01); *H02J 13/00002* (2020.01)

(58) Field of Classification Search
CPC . H02J 13/00002; H02J 13/00022; H02J 3/381
(Continued)

(56) References Cited

U.S. PATENT DOCUMENTS

2013/0151021 A1 6/2013 Kim
2014/0236513 A1* 8/2014 Xiao .................. G01R 21/06
702/65
(Continued)

FOREIGN PATENT DOCUMENTS

JP 2021-052488 A 4/2021
KR 10-1836439 B1 3/2018
(Continued)

OTHER PUBLICATIONS

Yeongung Seo et al., ESS Operation Scheduling Scheme Using LSTM for Peak Demand Reduction, Journal of KIISE, Nov. 2019, pp. 1165-1173, vol. 46, No. 11, The Korean Institute of Information Scientists and Engineers.

*Primary Examiner* — Jigneshkumar C Patel

(57) ABSTRACT

A method for controlling an energy storage system (ESS) and devices performing the method are disclosed. A method for controlling an ESS according to example embodiments, the method includes an operation of analyzing energy information of an area for which a peak power load is to be calculated received from a plurality of clients included in the area, an operation of generating, based on an analysis result, scheduling control information for controlling the ESS connected to the plurality of clients on a daily basis, an operation of determining, based on the scheduling control information, whether to generate real-time control information for controlling the ESS on a basis of a predetermined control time period, and an operation of correcting, based on the real-time control information, the scheduling control information.

17 Claims, 12 Drawing Sheets

(58) Field of Classification Search
USPC .......................................................... 700/295
See application file for complete search history.

(56) References Cited

U.S. PATENT DOCUMENTS

| | | | | |
|---|---|---|---|---|
| 2018/0226800 A1* | 8/2018 | Bhattarai | .................. | H02J 3/28 |
| 2018/0287217 A1* | 10/2018 | Takenaka | ............ | H01M 10/482 |
| 2019/0011970 A1* | 1/2019 | Youn | ...................... | G06F 1/3212 |
| 2020/0295566 A1 | 9/2020 | Nam | | |
| 2021/0192642 A1* | 6/2021 | Shin | .......................... | H02J 3/32 |

FOREIGN PATENT DOCUMENTS

| | | |
|---|---|---|
| KR | 10-2019-0005456 A | 1/2019 |
| KR | 10-2019-0007339 A | 1/2019 |
| KR | 10-2019-0107888 A | 9/2019 |
| KR | 10-2019-0112441 A | 10/2019 |
| KR | 10-2019-0131378 A | 11/2019 |

\* cited by examiner

330

(a) Daily energy consumption information pattern

340

(b) Daily energy generation information pattern (a) Before limiting ESS discharge amount according to PCS value (b) After limiting ESS discharge amount according to PCS value

METHOD FOR CONTROLLING ENERGY STORAGE SYSTEM AND DEVICES PERFORMING METHOD

CROSS-REFERENCE TO RELATED APPLICATIONS

This application claims the benefit of Korean Patent Application No. 10-2021-0060141 filed on May 10, 2021, and Korean Patent Application No. 10-2022-0000248 filed on Jan. 3, 2022, in the Korean Intellectual Property Office, the entire disclosures of which are incorporated herein by reference for all purposes.

BACKGROUND

1. Field of the Invention

One or more example embodiments relate to a method for controlling an energy storage system (ESS), and devices performing the method.

2. Description of the Related Art

An energy storage system (ESS) enables free charging and discharging of power, and accordingly a power grid may be efficiently managed using the ESS.

The ESS can be used to reduce a maximum load of a unit customer or building in terms of demand management, and a cost of using power energy using a time-of-use rate plan, or can be used to stabilize an output of new and renewable energy by adjusting, a generation time period and a discharge time period of the new and renewable energy in connection with generation of solar and wind power.

The above-described background technology is possessed or acquired by the inventor in a derivation process of the present invention, and is not necessarily a known technology disclosed to the general public prior to filing of the present application.

SUMMARY

An energy storage system (ESS) is used only for a single purpose, such as a reduction in a cost of using power energy, stabilization of an output of new and renewable energy, and adjustment of a power frequency. There is a limitation in efficiently managing a complex environment in which various power energy consumption sources, supply resources, and storage resources are mixed, such as a smart city. The complex environment such as the smart city requires a method for managing the smart city as a whole, rather than individually managing each resource by applying a single-purpose technology. Accordingly, a technology for defining the smart city as a single management unit and efficiently managing a relationship between the smart city and a power grid may be required.

Example embodiments provide a technology for managing large-scale power by optimally controlling an ESS.

Example embodiments provide a technology for managing a smart city and a smart town added to the smart city by optimally controlling an ESS.

However, a technical issue is not limited to the above-described technical issues, and other technical issues may exist.

According to an aspect, there is provided a method for controlling an ESS, the method including an operation of analyzing energy information of an area for which a peak power load is to be calculated received from a plurality of clients included in the area, an operation of generating, based on an analysis result, scheduling control information for controlling the ESS connected to the plurality of clients on a daily basis, an operation of determining, based on the scheduling control information, whether to generate real-time control information for controlling the ESS on a basis of a predetermined control time period, and an operation of correcting, based on the real-time control information, the scheduling control information. The peak power load may be an amount of peak power supplied to the area by a power backbone network that supplies power to the area. The energy information may include energy consumption information, energy generation information, and energy storage information generated by the ESS.

The area may be determined by a point of intersection of a distribution network included in the area and the power backbone network.

The operation of generating the scheduling control information may include an operation of generating, based on a threshold value at which a power conversion system (PCS) included in the ESS is capable of converting power and an energy consumption pattern in the area included in the analysis result, the scheduling control information for controlling charging and discharging of the ESS.

The method may further include an operation of reducing the peak power load by controlling, based on the scheduling control information, the ESS so that the ESS is discharged in a time zone with a large amount of energy consumed in the area, and is charged in a time zone with a small amount of energy consumed in the area.

The operation of determining may include an operation of predicting an amount of energy to be consumed and an amount of energy be generated in the area after the control time period, and an operation of determining, based on the scheduling control information, the predicted amount of energy to be consumed, and the predicted amount of energy to be generated, whether to generate the real-time control information for controlling charging and discharging of the ESS.

The operation of correcting may include an operation of correcting the scheduling control information so as to prevent reverse transmission of power from the area to the power backbone network by controlling, based on the corrected scheduling control information, the ESS.

The operation of correcting may include an operation of correcting the scheduling control information so that the peak power load does not have a value greater than a preset value by controlling, based on the corrected scheduling control information, the ESS.

The method may include an operation of distributing the corrected scheduling control information to the plurality of clients.

The method may include an operation of settling, based on the energy information to which the corrected scheduling control information is reflected, a cost of power generated in the area with the plurality of clients.

According to another aspect, there is provided a server device including a memory including instructions, and a processor electrically connected to the memory, the processor configured to execute the instructions. When the instructions are executed by the processor, the processor may be configured to analyze energy information of an area for which a peak power load is to be calculated received from a plurality of clients included in the area, generate, based on an analysis result, scheduling control information for controlling an ESS connected to the plurality of clients on a daily basis, determine, based on the scheduling control information, whether to generate real-time control information for controlling the ESS on a basis of a predetermined control time period, and correct, based on the real-time control information, the scheduling control information. The peak power load may be an amount of peak power supplied to the area by a power backbone network that supplies power to the area. The energy information may include energy consumption information, energy generation information, and energy storage information generated by the ESS.

The area may be determined by a point of intersection of a distribution network included in the area and the power backbone network.

The processor may be configured to generate, based on a threshold value at which a PCS included in the ESS is capable of converting power and an energy consumption pattern in the area included in the analysis result, the scheduling control information for controlling charging and discharging of the ESS.

The processor may be configured to reduce the peak power load by controlling, based on the scheduling control information, the ESS so that the ESS is discharged in a time zone with a large amount of energy consumed in the area, and is charged in a time zone with a small amount of energy consumed in the area.

The processor may be configured to predict an amount of energy to be consumed and an amount of energy be generated in the area after the control time period, and determine, based on the scheduling control information, the predicted amount of energy to be consumed, and the predicted amount of energy to be generated, whether to generate the real-time control information for controlling charging and discharging of the ESS.

The processor may be configured to correct the scheduling control information so as to prevent reverse transmission of power from the area to the power backbone network by controlling, based on the corrected scheduling control information, the ESS.

The processor may be configured to correct the scheduling control information so that the peak power load does not have a value greater than a preset value by controlling, based on the corrected scheduling control information, the ESS.

The processor may be configured to distribute the corrected scheduling control information to the plurality of clients.

The processor may be configured to settle, based on the energy information to which the corrected scheduling control information is reflected, a cost of power generated in the area with the plurality of clients.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
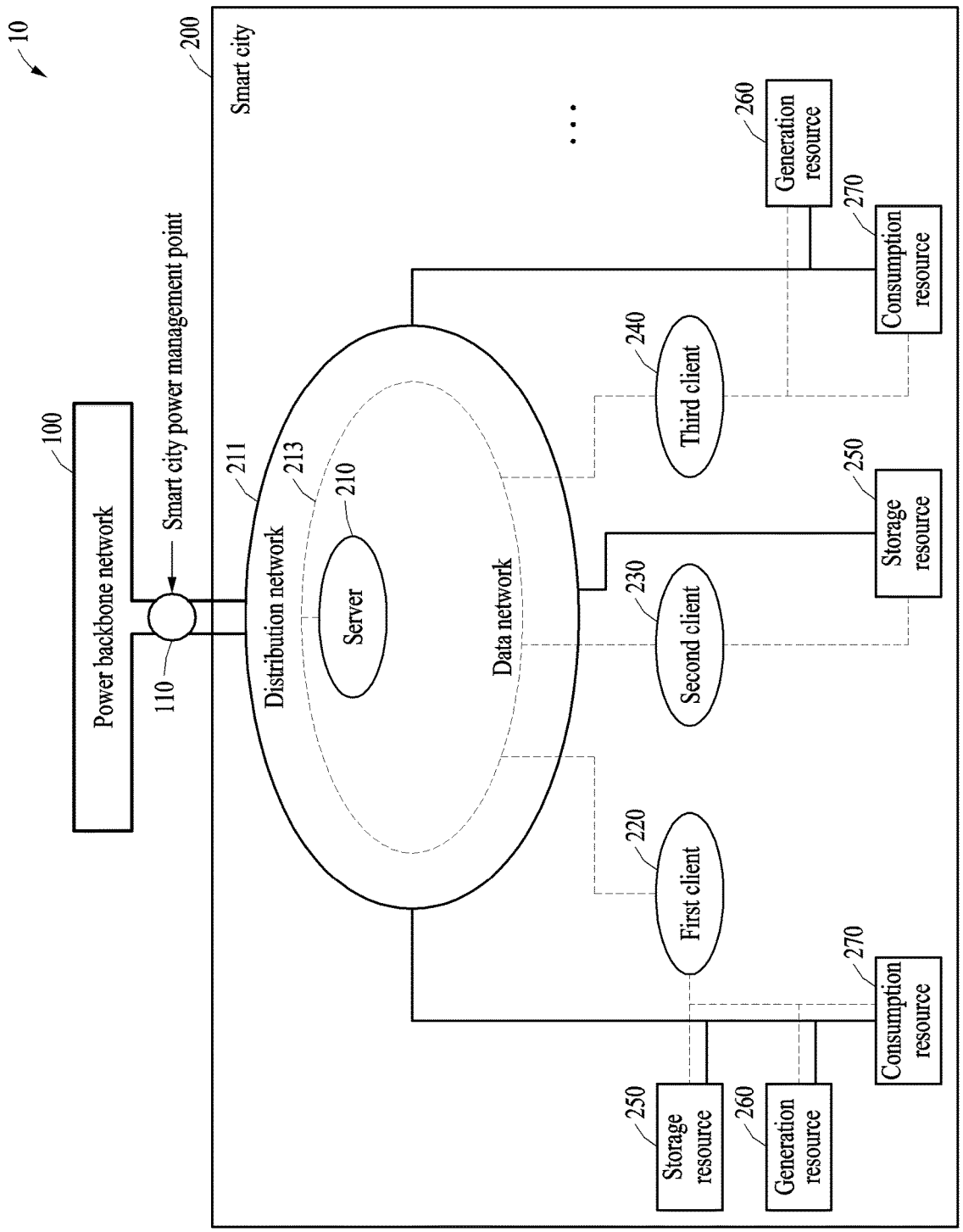
FIG. 1 is a diagram illustrating a system according to example embodiments.

The following structural or functional descriptions of example embodiments described herein are merely intended for the purpose of describing the example embodiments described herein and may be implemented in various forms. Here, the example embodiments are not construed as limited to the disclosure and should be understood to include all changes, equivalents, and replacements in the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component in the scope of the present disclosure.

When it is mentioned that one component is "connected" or "accessed" to another component, it may be understood that the one component is directly connected or accessed to another component or that still other component is interposed between the two components.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 is a diagram illustrating a system according to example embodiments.

FIG. 1 is a diagram illustrating a system 10 according to example embodiments. The system 10 may include a power backbone network 100 and a smart city 200 that receives power from the power backbone network 100. The smart city 200 may be an area in which a peak power load is to be calculated, and the area may be determined by a point of intersection (for example, a smart city power management point 110) of a distribution network 211 included in the smart city and the power backbone network 100. The peak power load may be an amount of peak power supplied to the area by the power backbone network 100.

According to example embodiments, the system 10 may calculate, based on energy information received from a plurality of clients (for example, a first client 220, a second client 230, a third client 240, and the like) included in the smart city 200, the peak power load of the smart city 200. In order to reduce the peak power load of the smart city 200, the system 10 may generate control information (for example, scheduling control information and the scheduling control information corrected based on real-time control information) on a storage resource 250 included in the smart city 200. The storage resource 250 may be connected to the plurality of clients (for example, the first client 220, the second client 230, the third client 240, and the like) included in the smart city 200.

According to example embodiments, the system 10 may reduce the peak power load of the smart city 200 by controlling, based on the control information, the storage resource 250. The system 10 may distribute the control information to the plurality of clients (for example, the first client 220, the second client 230, the third client 240, and the like) connected to the storage resource 250, and may settle, based on the energy information to which the corrected scheduling control information is reflected, a cost of power generated in the smart city 200 with the plurality of clients (for example, the first client 220, the second client 230, the third client 240, and the like).

According to example embodiments, the smart city 200 may include a server 210 that manages the smart city 200, the distribution network 211, a data network 213, the plurality of clients (for example, the first client 220, the second client 230, the third client 240, and the like), and an energy resource (for example, the storage resource 250, a generation resource 260, and a consumption resource 270). The data network 213 that connects the server 210 and the plurality of clients (for example, the first client 220, the second client 230, the third client 240, and the like), the distribution network 211 that connects the power backbone network 100 and the energy source (for example, the storage resource 250, the generation resource 260, and the consumption resource 270), and the energy source connected to the plurality of clients (for example, the first client 220, the second client 230, the third client 240, and the like) by the data network 213 may be included.

According to example embodiments, the plurality of clients (for example, the first client 220, the second client 230, the third client 240, and the like) may connected to one or more energy resources (for example, the storage resource 250, the generation resource 260, and the consumption resource 270), and the plurality of clients may acquire energy information generated in a partial area of the smart city 200 managed by each of the plurality of clients. For example, the plurality of clients may acquire energy storage information from the storage resource 250 connected to each of the clients, acquire energy generation information from the generation resource 260, and acquire energy consumption information from the consumption resource 270. The plurality of clients (for example, the first client 220, the second client 230, the third client 240, and the like) may control, based on information (for example, control information) received from the server 210 through the data network 213, an energy resource (for example, the storage resource 250) connected to each of the plurality of clients. According to example embodiments, the server 210 may transmit and receive, through the data network 213, the plurality of clients (for example, the first client 220, the second client 230, the third client 240, and the like) and information (for example, energy information and control information). The power backbone network 100 may transmit and receive, through the distribution network 211, the energy resources (for example, the storage resource 250, the generation resource 260, and the consumption resource 270) and power.

According to example embodiments, the storage resource 250 may be a resource for storing power, such as an energy storage system (ESS) and the like, and the generation resource 260 may be a resource for generating power, such as a photovoltaic (PV) and the like, and the consumption resource 270 may be a resource for consuming power, such as a building and the like.

According to example embodiments, the server 210 may analyze energy information in the smart city 200 received from the plurality of clients (for example, the first client 220, the second client 230, the third client 240, and the like). The server 210 may generate, based on an analysis result, scheduling control information for controlling the storage resource 250 connected to the plurality of clients (for example, the first client 220, the second client 230, the third client 240, and the like) on a daily basis. The server 210 may determine, based on the scheduling control information, whether to generate real-time control information for controlling the storage resource 250 on a basis of a predetermined control time period. The server 210 may correct, based on the real-time control information, the scheduling control information.

According to example embodiments, the server 210 may distribute the corrected scheduling control information to the plurality of clients (for example, the first client 220, the second client 230, the third client 240, and the like) so that the plurality of clients control the storage resource 250 connected to each of the plurality of clients.

According to example embodiments, the server 210 may settle, based on the energy information to which the corrected scheduling control information is reflected, a cost of power generated in the smart city 200 with the plurality of clients (for example, the first client 220, the second client 230, the third client 240, and the like). For example, the server 210 may settle, based on an amount of energy consumed, an amount of energy generated, and an amount of energy charged/discharged to which the corrected scheduling control information is reflected of each of the plurality of clients, the cost of power with the plurality of clients.

According to example embodiments, the server 210 may correct, based on the real-time control information, the scheduling control information, thereby providing optimal control information corresponding to a control purpose (for example, a reduction in the peak power load of the smart city 200) in real time. The server 210 may control, based on the control information, the storage resource 250, thereby effectively reducing a peak load of an amount of power supplied to the smart city 200 by the power backbone network 100 through the smart city power management point 110. In FIG. 1, a case in which the control purpose is to reduce the peak power load of the smart city 200 is described, but is not necessarily limited thereto. Depending on an example embodiment, the control purpose may be to resolve an issue related to power in the smart city 200 in addition to the reduction in the peak power load of the smart city 200.

Figure 2:
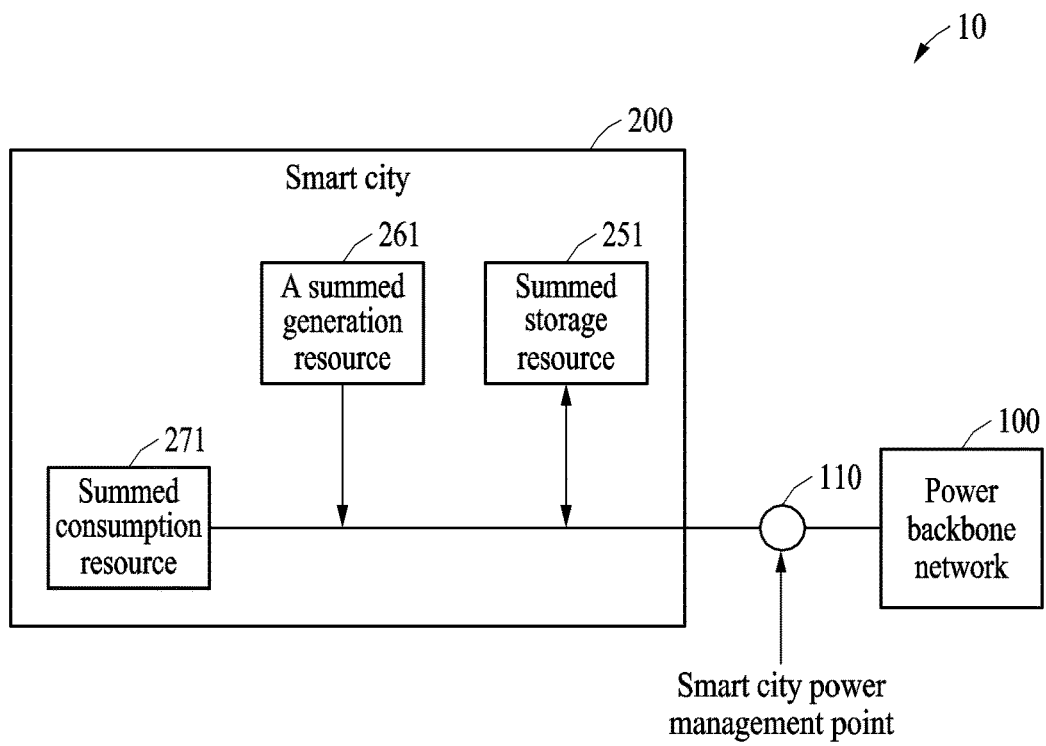
FIG. 2 is a schematic diagram illustrating a system according to example embodiments.

FIG. 2 is a schematic diagram illustrating a system according to example embodiments.

Referring to FIG. 2, according to example embodiments, the system 10 may generate summed energy resources (for example, a summed storage resource 251, a summed generation resource 261, and a summed consumption resource 271) obtained by summing a plurality of energy resources (for example, the storage resource 250, the generation resource 260, and the consumption resource 270) included in the smart city 200.

According to example embodiments, the summed storage resource 251 may charge or discharge power in the smart city 200, the summed generation resource 261 may produce power in the smart city 200, and the summed consumption resource 271 may consume power in the smart city 200. When the summed storage resource 251 charges power, an amount of power supplied by the power backbone network 100 to the smart city 200 may be defined by [Equation 1].

$$P_1 = P_2 - P_3 + P_4 \quad \text{[Equation 1]}$$

Here, $P_1$ may be an amount of power supplied by the power backbone network 100 to the smart city 200, $P_2$ may be an amount of energy consumed by the summed consumption resource 271, $P_3$ may be an amount of energy generated by the summed power generation resource 261, and $P_4$ may be an amount of energy charged by the summed storage resource 251.

According to example embodiments, when the summed storage resource 251 discharges power, the amount of power supplied by the power backbone network 100 to the smart city 200 may be defined by [Equation 2].

$$P_1 = P_2 - P_3 - P_4 \quad \text{[Equation 2]}$$

Here, $P_1$ may be an amount of power supplied by the power backbone network 100 to the smart city 200, $P_2$ may be an amount of energy consumed by the summed consumption resource 271, $P_3$ may be an amount of energy generated by the summed generation resource 261, $P_4$ and may be an amount of energy discharged by the summed storage resource 251.

According to example embodiments, the server 210 may generate control information (for example, scheduling control information and the scheduling control information corrected based on real-time control information). The server 210 may control, based on the control information, the amount of energy charged by the summed storage source 250, thereby effectively adjusting a peak load of an amount of power supplied to the smart city 200 by the power backbone network 100 through the smart city power management point 110 to have a value greater than a preset value (for example, an amount of power that is accommodatable at the smart city power management point 110). In addition, the server 210 may control, based on the control information, the amount of energy discharged by the summed storage resource 251, thereby effectively reducing the peak load of the amount of power supplied to the smart city 200 by the power backbone network 100 through the smart city power management point 110.

Figure 3A:
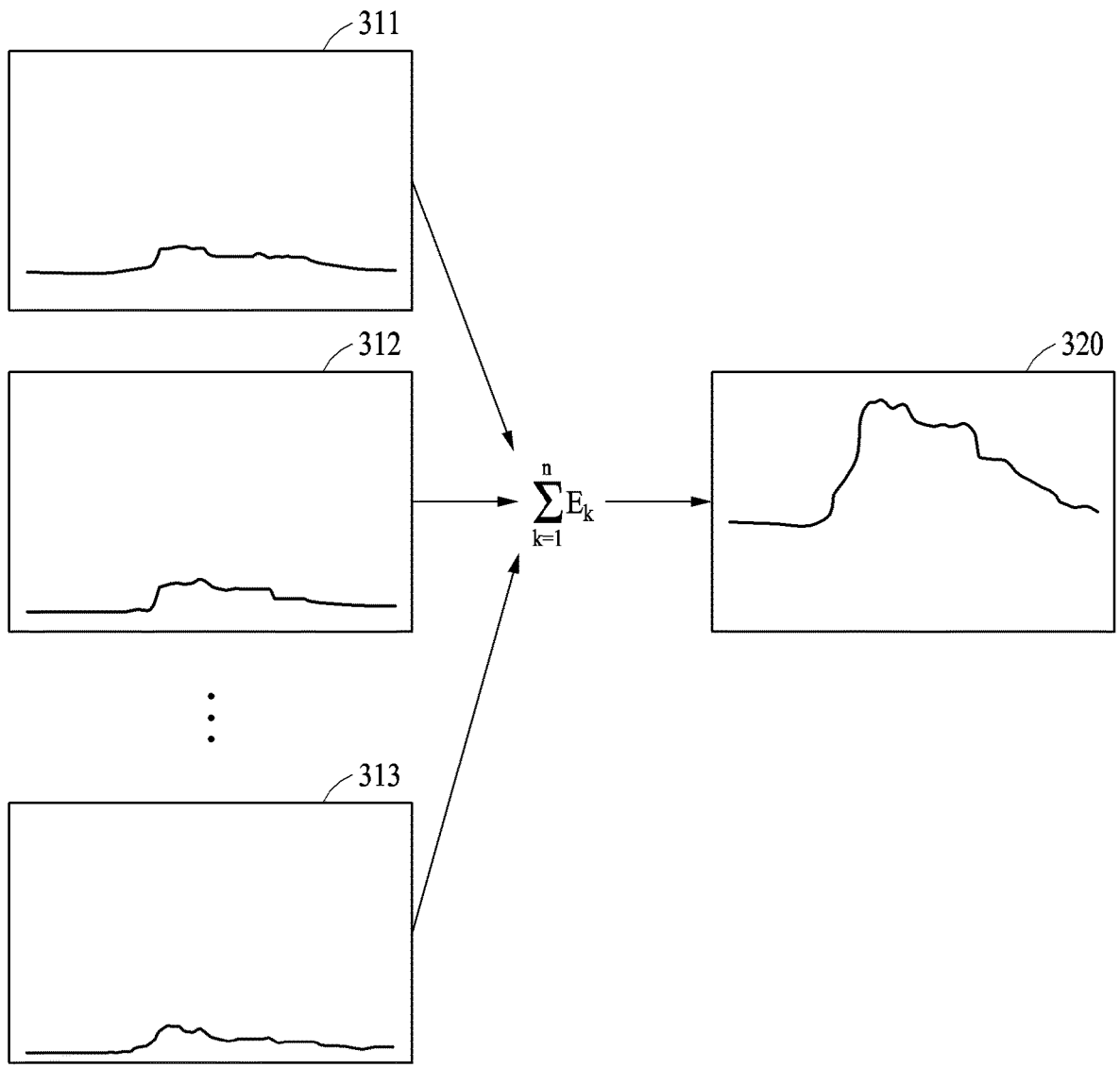
FIG. 3A is a diagram illustrating an operation of summing, by a server, energy information according to example embodiments.

FIG. 3A is a diagram illustrating an operation of summing, by a server, energy information according to example embodiments.

Referring to FIG. 3A, according to example embodiments, a server (for example, the server 210 in FIG. 1) may sum each of energy consumption information, energy generation information, and energy storage information generated in a smart city (for example, the smart city 200 in FIG. 1) gathered at the smart city power management point 110. For example, the server 210 may sum daily patterns 311, 312, and 313 of hourly energy consumption information of the consumption resource 270 connected to the plurality of clients to generate a daily pattern 320 of energy consumption information of the summed consumption resource 270. A horizontal axis of the daily pattern 320 of the energy consumption information may refer to time, and a vertical axis of the daily pattern 320 of the energy consumption information may refer to an amount of energy consumed.

Figure 3B:
FIG. 3B is a diagram illustrating an operation of analyzing, by a server, energy information according to example embodiments.
Figure 3B:
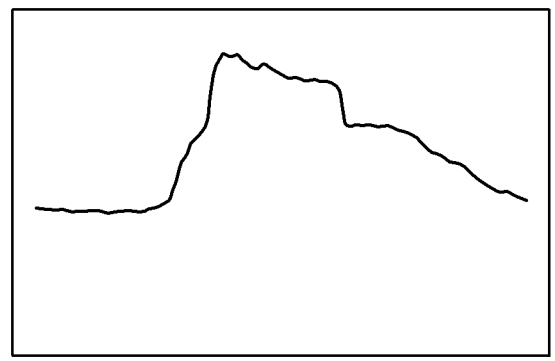
Figure 3B:
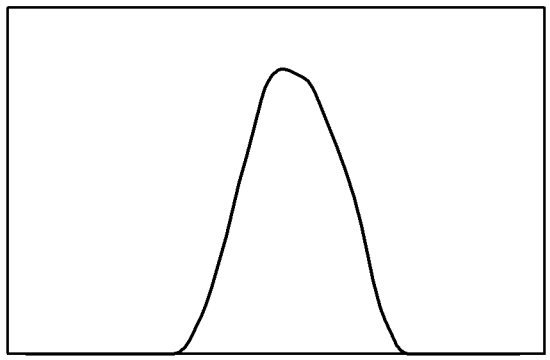
Figure 3B:
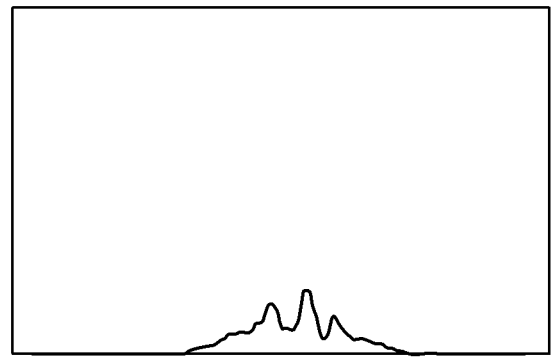

FIG. 3B is a diagram illustrating an operation of analyzing, by a server, energy information according to example embodiments.

Referring to FIG. 3B, according to example embodiments, a server (for example, the server 210 in FIG. 1) may analyze a daily pattern of energy consumption information and a daily pattern of energy generation information. The daily pattern of the energy consumption information and the daily pattern of the energy generation information represent an amount of energy consumed and an amount of energy generated from 0:00 to 24:00, respectively. For example, the server 210 may analyze the daily pattern of the energy consumption information to analyze a pattern in which the amount of energy consumed increases until 12:00 pm, which is a middle of the pattern, and decreases from 12:00 pm. The server 210 may generate, based on an analysis result, scheduling control information for controlling a storage resource (for example, the storage resource 250 in FIG. 1).

Figure 4A:
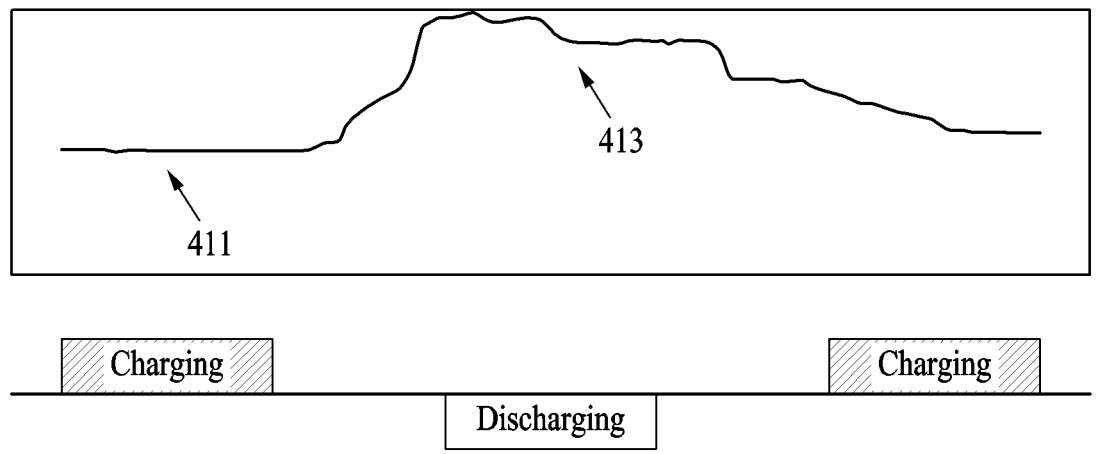
FIG. 4A is a diagram illustrating an operation of generating, by a server, scheduling control information based on an analysis result according to example embodiments.

FIG. 4A is a diagram illustrating an operation of generating, by a server, scheduling control information based on an analysis result according to example embodiments.

Referring to FIG. 4A, according to example embodiments, the server 210 may analyze a daily pattern of energy consumption information, and generate, based on an analysis result, scheduling control information for controlling charging and discharging of a storage resource (for example, the storage resource 250 in FIG. 1) on a daily basis. For example, the server 210 may generate the scheduling control information, based on a threshold value at which a power conversion system (PCS) for determining a charge/discharge time period of the storage resource 250, a capacity of the storage resource 250, and a maximum amount of the storage resource 250 charged/discharged is capable of converting power as a result of analyzing the daily pattern of the energy consumption information.

According to example embodiments, in order to reduce a peak power load, the server 210 may generate scheduling control information for controlling the storage source 250 on a daily basis so that the storage source 250 is discharged in a second time zone 413 with a large amount of energy consumed in the smart city 200, and is charged in a first time zone 411 with a small amount of energy consumed in the smart city 200. The server 210 may generate the scheduling control information reflecting the threshold value of the PCS by an operation described below with reference to FIG. 4B.

According to example embodiments, the server 210 may generate the scheduling control information by classifying a case where daily patterns of the energy consumption information are different from each other (for example, weekdays and holidays). The server 210 may update the scheduling control information on a regular basis by reflecting external circumstances (for example, a change in peak power load time of the smart city 200 by time of day, a rate policy change according to a time-of-use rate plan, and the like). In FIG. 4A, a case in which scheduling control information is generated by statistically analyzing the daily pattern of the energy consumption information is described, but is not necessarily limited thereto. Depending on an example embodiment, the scheduling control information may be generated by an artificial intelligence algorithm.

Figure 4B:
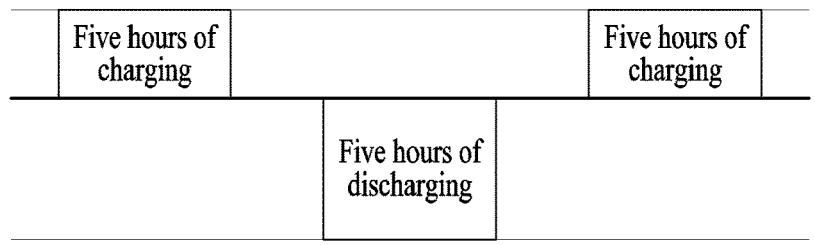
FIG. 4B is a diagram illustrating an operation of generating, by a server, scheduling control information based on a threshold value of a power conversion system (PCS) according to example embodiments.
Figure 4B:
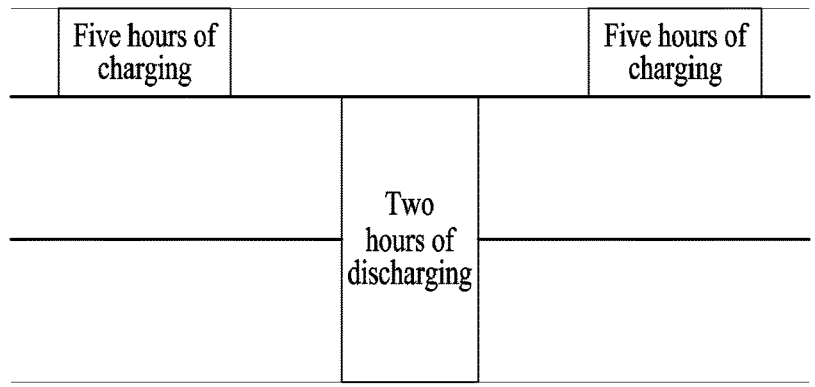
Figure 4B:
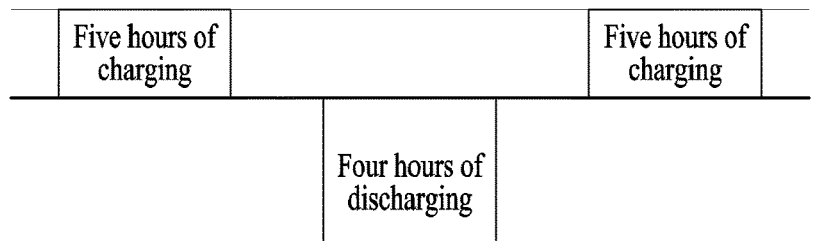

FIG. 4B is a diagram illustrating an operation of generating, by a server, scheduling control information based on a threshold value of a PCS according to example embodiments.

Referring to FIG. 4B, according to example embodiments, the server 210 may generate, based on a threshold value at which a PCS is capable of converting power, scheduling control information. The server 210 may control maximum amounts of energy charged and energy discharged per hour of a storage resource (for example, the storage resource 250 in FIG. 1) to be less than the threshold value of the PCS. For example, in a first case 420, the maximum amounts of energy charged and energy discharged per hour may be 10 kW and 20 kW, respectively, and thus the maximum amounts of energy charged and energy discharged per hour may not be greater than the threshold value of the PCS of 25 kW. In a second case 431, maximum amounts of energy charged and energy discharged per hour may be 10 kW and 50 kW, respectively, and thus the maximum amount of energy discharged per hour may be greater than the threshold value of the PCS of 25 kW. In the second case 431, the server 210 may generate scheduling control information for controlling the storage 250 so that the maximum amount of energy discharged per hour of the storage source 250 is reduced to 25 kW, which is the threshold value of the PCS, and a discharge time period is increased from two hours to four hours in inverse proportion to the maximum amount of energy discharged per hour.

Figure 4C:
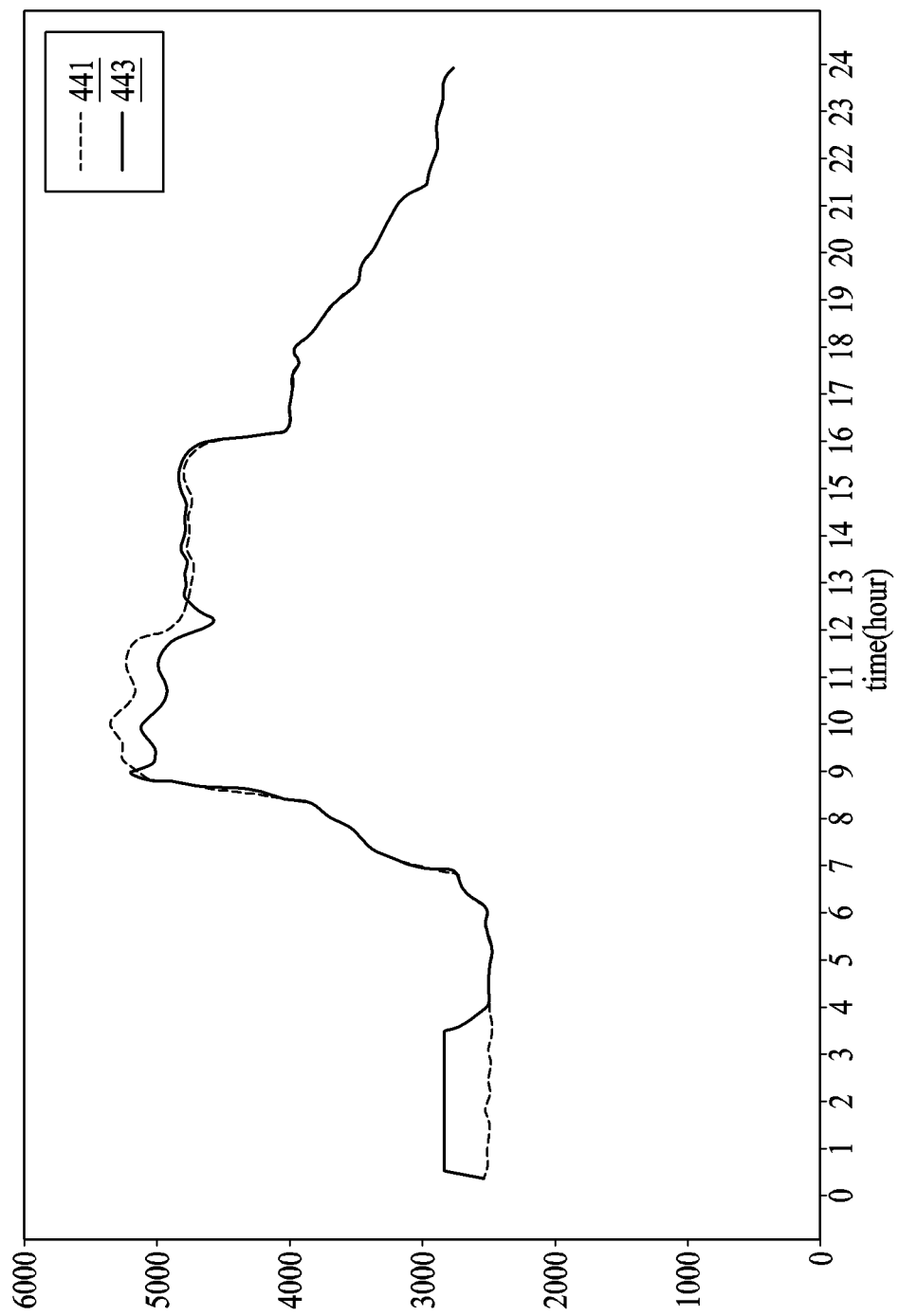
FIG. 4C is a diagram illustrating a result of performing control based on scheduling control information according to example embodiments.

FIG. 4C is a diagram illustrating a result of performing control based on scheduling control information according to example embodiments.

Referring to FIG. 4C, according to example embodiments, in order to reduce a peak power load, the server 210 may control, based on scheduling control information, the storage source 250 on a daily basis so that the storage source 250 is discharged in a time zone with a large amount of energy consumed in the smart city 200, and is charged in a time zone with a small amount of energy consumed in the smart city 200. By controlling the storage resource 250, the server 210 may reduce a peak power load of an amount of power supplied by the power backbone network 100 to the smart city 200 through the smart city power management point 110. For example, an amount of power 443 supplied by the power backbone network 100 to the smart city 200 after control may have a peak power load reduced from a peak power load of an amount of power 441 supplied by the power backbone network 100 to the smart city 200 before control.

Figure 5A:
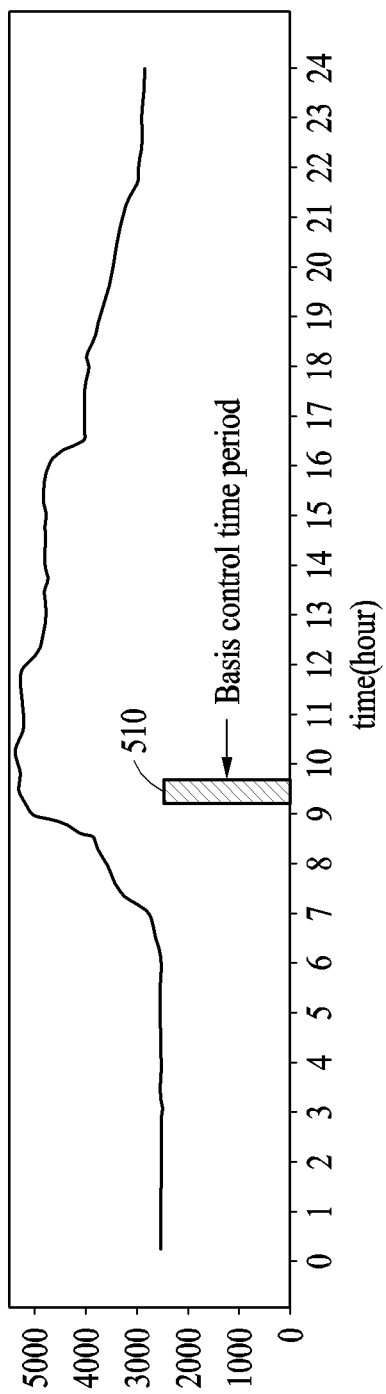
FIG. 5A is a diagram illustrating a method for generating, by a server, real-time control information according to example embodiments.

FIG. 5A is a diagram illustrating a method for generating, by a server, real-time control information according to example embodiments.

Referring to FIG. 5A, according to example embodiments, the server 210 may determine, based on scheduling control information, whether to generate real-time control information for controlling the storage resource 250 on a basis of a predetermined control time period. For example, the server 210 may generate the real-time control information for controlling the storage resource 250 on a fifteen-minute basis, and may control the storage resource 250 in real time ninety six times during a day.

Figure 5B:
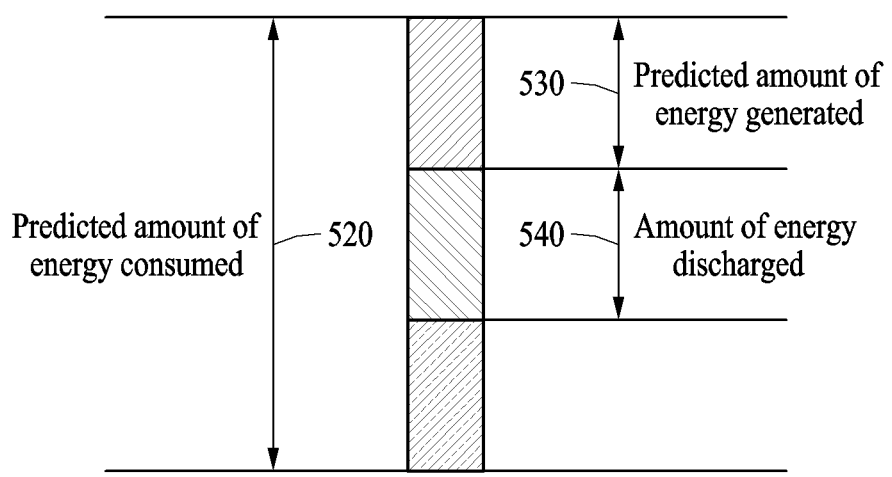
FIG. 5B is a diagram illustrating a method for determining, by a server, whether to generate real-time control information according to example embodiments.

FIG. 5B is a diagram illustrating a method for determining, by a server, whether to generate real-time control information according to example embodiments.

Referring to FIG. 5B, according to example embodiments, the server 210 may predict an amount of energy to be consumed and an amount of energy to be generated in the smart city 200 after a control time period (for example, fifteen minutes). The server 210 may determine whether to generate, based on scheduling control information, the predicted amount of energy to be consumed, and the predicted amount of energy to be generated, real-time control information for controlling charging and discharging of the storage resource 250. For example, the server 210 may generate the real-time control information when reverse transmission of power from the smart city 200 to the power backbone network 100 occurs.

Figure 5C:
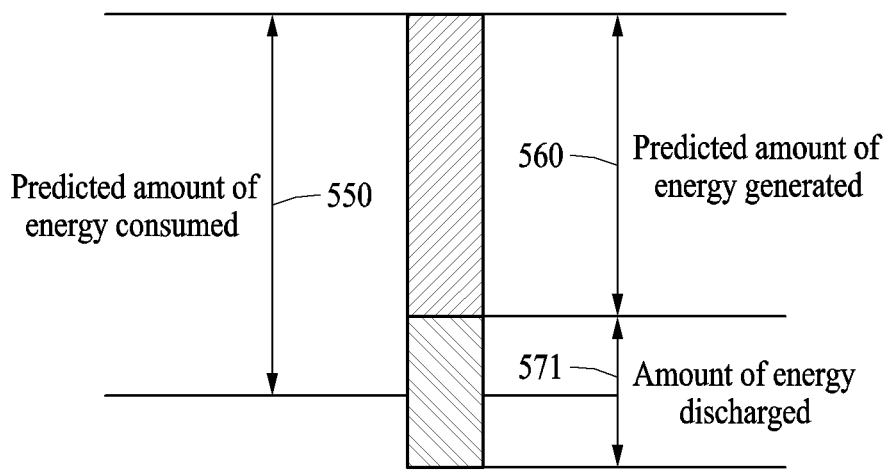
FIG. 5C is a diagram illustrating an operation of controlling, by a server, controlling an energy storage system (ESS) based on scheduling control information corrected so as to prevent reverse transmission of power according to example embodiments.
Figure 5C:
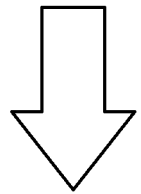
Figure 5C:
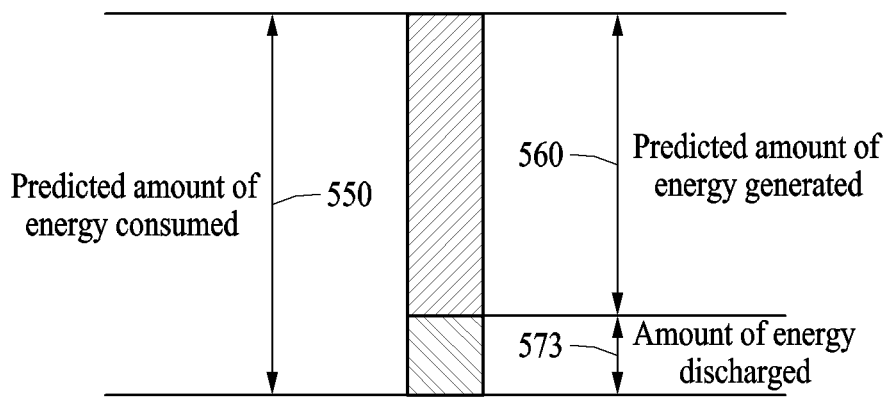

FIG. 5C is a diagram illustrating an operation of controlling, by a server, controlling an ESS based on scheduling control information corrected so as to prevent reverse transmission of power according to example embodiments.

Referring to FIG. 5C, according to example embodiments, the server 210 may generate real-time control information for preventing occurrence of reverse transmission of power from the smart city 200 to the power backbone network 100 due to a sum of a predicted amount of energy generated 560 and a first amount of energy discharged 571 greater than a predicted amount of energy consumed 550. For example, the server 210 may generate the real-time control information for controlling the storage resource 250 so that the sum of the predicted amount of energy generated 560 and the first amount of energy discharged 571 is not greater than the predicted amount of energy consumed 550.

According to example embodiments, the server 210 may correct, based on the real-time control information, the scheduling control information, and may control, based on the corrected scheduling control information, the storage resource 250. For example, the server 210 may control the storage resource 250 so that a sum of the predicted amount of energy to be generated 560 and a second amount of energy discharged 573 is not greater than the predicted amount of energy consumed 550, thereby preventing reverse transmission of power from the smart city 200 to the power backbone network 100. The first amount of energy discharged 571 of the storage resource 250 may be reduced, based on the corrected scheduling control information, to the second amount of energy discharged 573. As a result, a second discharge time period corresponding to the second amount of energy discharged 573 may be longer than a first discharge time period corresponding to the first amount of energy discharged 571.

According to example embodiments, the server 210 may distribute control information to a plurality of clients (for example, the first client 220, the second client 230, the third client 240, and the like) connected to the storage resource 250, and may settle, based on energy information to which the corrected scheduling control information is reflected, a cost of power generated in the smart city 200 with the plurality of clients (for example, the first client 220, the second client 230, the third client 240, and the like).

Figure 6:
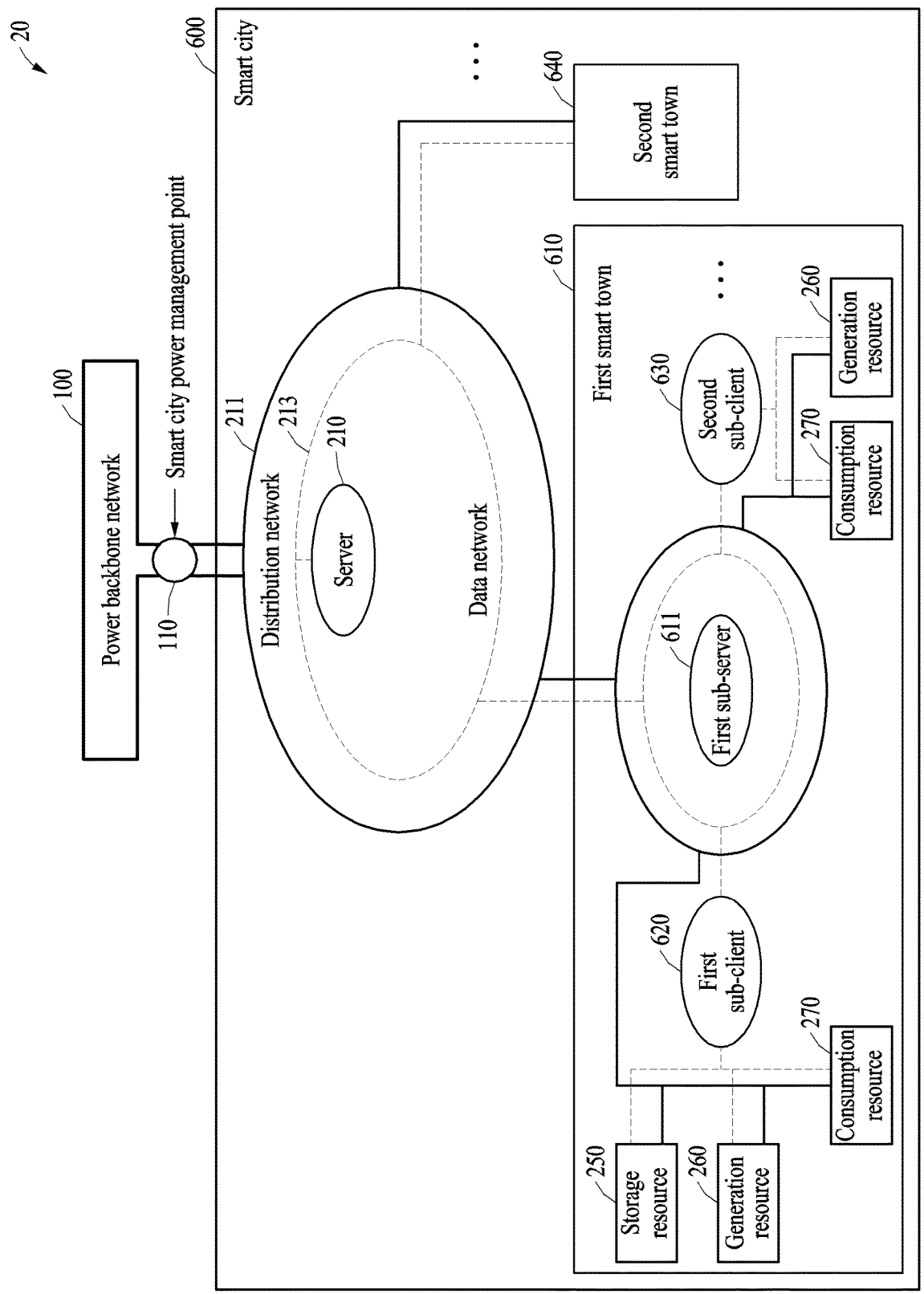
FIG. 6 is a diagram illustrating another example of a system according to example embodiments.

FIG. 6 is a diagram illustrating another example of a system according to example embodiments.

Referring to FIG. 6, according to example embodiments, a system 20 may calculate a peak power load of the smart city 200, based on energy information (for example, energy consumption information) received from a plurality of smart towns (for example, a first smart town 610, a second smart town 640, and the like) included in a smart city 600. The system 20 may be an extension of a plurality of clients (for example, the first client 220, the second client 230, the third client 240, and the like in FIG. 1) included in a system (the system 10 in FIG. 1) to the plurality of smart towns (for example, the first smart town 610, the second smart town 640, and the like).

According to example embodiments, each of the plurality of smart towns (for example, the first smart town 610, the second smart town 640, and the like) may include the distribution network 211, the data network 213, and a sub-server (for example, a sub-server 611, and the like), a plurality of sub-clients (for example, a first sub-client 620, a second sub-client 630, and the like), and an energy resource (for example, the storage resource 250, the generation resource 260, and the consumption resource 270).

According to example embodiments, the plurality of smart towns (for example, the first smart town 610, the second smart town 640, and the like) may passively operate to operate in substantially the same manner as the plurality of clients (for example, the first client 220, the second client 230, the third client 240, and the like), or may actively operate so that each of the plurality of smart towns controls the storage resource 250 included in the plurality of smart towns.

According to example embodiments, when the plurality of smart towns (for example, the first smart town 610, the second smart town 640, and the like) passively operate, the sub-server (for example, the first sub-server 611 and the like) may sum energy information (for example, energy storage information, energy consumption information, and energy generation information) of a smart town (for example, the first smart town 610) received from the plurality of sub-clients (for example, the first sub-client 620, the second sub-client 630, and the like), and may transmit the summed energy information to the server 210. The sub-server (for example, the first sub-server 611, and the like) may receive control information (for example, scheduling control information and real-time control information) generated based on the energy information by the server 210, and may distribute the control information to the plurality of sub-clients (for example, the first sub-client 620, the second sub-client 630, and the like). The plurality of sub-clients (for example, the first sub-client 620, the second sub-client 630, and the like) may control, based on the control information, the storage resource 250 connected to each of the plurality of sub-clients (for example, the first sub-client 620, the second sub-client 630, and the like).

According to example embodiments, when the plurality of smart towns (for example, the first smart town 610, the second smart town 640, and the like) actively operate, the sub-server (for example, the first sub-server 611 and the like) may control, based on the energy information (for example, energy storage information, energy consumption information, and energy generation information) of a smart town (for example, the first smart town 610) received from the plurality of sub-clients (for example, the first sub-client 620, the second sub-client 630, and the like), the storage resource 250 included in the smart town.

According to example embodiments, when the plurality of smart towns (for example, the first smart town 610, the second smart town 640, and the like) actively operate, the sub-server (for example, the first sub-server 611 and the like) may control the storage resource 250, thereby transmitting, to the server 210, the peak power load of the controlled (for example, reduced) smart town.

Figure 7:
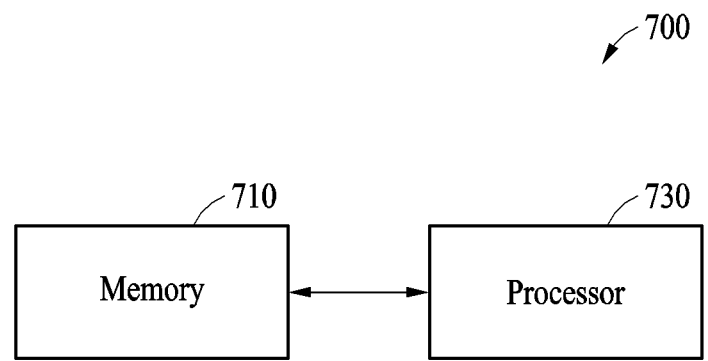
FIG. 7 is a diagram illustrating another example of a server according to example embodiments.

FIG. 7 is a diagram illustrating another example of a server according to example embodiments.

Referring to FIG. 7, according to example embodiments, a server 700 may include a memory 710 and a processor 730.

According to example embodiments, the memory 710 may store instructions (for example, programs) that are executable by the processor 730. For example, the instructions may include instructions for executing an operation of the processor 730 and/or an operation of each component of the processor 730.

According to example embodiments, the memory 710 may be implemented as a volatile memory device or a non-volatile memory device. The volatile memory device may be implemented as dynamic random access memory (DRAM), static random access memory (SRAM), thyristor RAM (T-RAM), zero capacitor RAM (Z-RAM), or twin transistor RAM (TTRAM). The non-volatile memory device may be implemented as electrically erasable programmable read-only memory (EEPROM), flash memory, magnetic RAM (MRAM), spin-transfer torque (STT)-MRAM, conductive bridging RAM (CBRAM), ferroelectric RAM (FeRAM), phase change RAM (PRAM), resistive RAM (RRAM), nanotube RRAM, polymer RAM (PoRAM), nano floating gate memory (NFGM), holographic memory, molecular electronic memory device, and/or insulator resistance change memory.

According to example embodiments, the processor 730 may execute computer-readable code (for example, software) stored in the memory 710 and instructions induced by the processor 730. The processor 1130 may be a hardware-implemented data processing device having a circuit with a physical structure for executing desired operations. For example, the desired operations may include a code or instructions included in a program. For example, the hardware-implemented data processing device may include a microprocessor, a central processing unit, a processor core, a multi-core processor, and a multiprocessor, an application-specific integrated circuit (ASIC), and a field programmable gate array (FPGA).

According to example embodiments, the operation performed by the processor 730 may be substantially the same as the operation of the server 210 described with reference to FIGS. 1 to 6. Accordingly, a detailed description thereof will be omitted.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The example embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter.

The described hardware devices may be configured to act as one or more software modules in order to perform the operations of the above-described example embodiments, or vice versa.

While this disclosure includes example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method for controlling an energy storage system (ESS), the method comprising:
    an operation of analyzing energy information of an area for which a peak power load is to be calculated received from a plurality of clients included in the area;
    an operation of generating, based on an analysis result, scheduling control information for controlling the ESS connected to the plurality of clients on a daily basis, the operation of generating the scheduling control information comprising an operation of generating, based on a threshold value at which a power conversion system (PCS) included in the ESS is capable of converting power and an energy consumption pattern in the area included in the analysis result, the scheduling control information for controlling charging and discharging of the ESS;
    an operation of determining, based on the scheduling control information, whether to generate real-time control information for controlling the ESS on a basis of a predetermined control time period;
    an operation of correcting, based on the real-time control information, the scheduling control information; and
    an operation of controlling the ESS based on the scheduling control information,
    wherein the peak power load is an amount of peak power supplied to the area by a power backbone network that supplies power to the area, and
    the energy information includes energy consumption information, energy generation information, and energy storage information generated by the ESS.

2. The method of claim 1, wherein the area is determined by a point of intersection of a distribution network included in the area and the power backbone network.

3. The method of claim 1, further comprising:
    an operation of reducing the peak power load by controlling, based on the scheduling control information, the ESS so that the ESS is discharged in a time zone with a large amount of energy consumed in the area, and is charged in a time zone with a small amount of energy consumed in the area.

4. The method of claim 1, wherein the operation of determining comprises:
    an operation of predicting an amount of energy to be consumed and an amount of energy be generated in the area after the control time period; and
    an operation of determining, based on the scheduling control information, the predicted amount of energy to be consumed, and the predicted amount of energy to be generated, whether to generate the real-time control information for controlling charging and discharging of the ESS.

5. The method of claim 1, wherein the operation of correcting comprises an operation of correcting the scheduling control information so as to prevent reverse transmission of power from the area to the power backbone network by controlling, based on the corrected scheduling control information, the ESS.

6. The method of claim 1, wherein the operation of correcting comprises an operation of correcting the scheduling control information so that the peak power load does not have a value greater than a preset value by controlling, based on the corrected scheduling control information, the ESS.

7. The method of claim 1, comprising:
an operation of distributing the corrected scheduling control information to the plurality of clients.

8. The method of claim 1, comprising:
an operation of settling, based on the energy information to which the corrected scheduling control information is reflected, a cost of power generated in the area with the plurality of clients.

9. A non-transitory computer-readable medium storing computer-readable instruction that, when executed by a processor, cause the processor to perform the method of claim 1.

10. A server device comprising:
a memory including instructions; and
a processor electrically connected to the memory, the processor configured to execute the instructions,
wherein, when the instructions are executed by the processor, the processor is configured to:
analyze energy information of an area for which a peak power load is to be calculated received from a plurality of clients included in the area;
generate, based on an analysis result, scheduling control information for controlling an energy storage system (ESS) connected to the plurality of clients on a daily basis;
generate, based on a threshold value at which a power conversion system (PCS) included in the ESS is capable of converting power and an energy consumption pattern in the area included in the analysis result, the scheduling control information for controlling charging and discharging of the ESS;
determine, based on the scheduling control information, whether to generate real time control information for controlling the ESS on a basis of a predetermined control time period;
correct, based on the real-time control information, the scheduling control information; and control the ESS based on the scheduling control information,
wherein the peak power load is an amount of peak power supplied to the area by a power backbone network that supplies power to the area, and
wherein the energy information includes energy consumption information, energy generation information, and energy storage information generated by the ESS.

11. The server device of claim 10, wherein the area is determined by a point of intersection of a distribution network included in the area and the power backbone network.

12. The server device of claim 10, wherein the processor is configured to reduce the peak power load by controlling, based on the scheduling control information, the ESS so that the ESS is discharged in a time zone with a large amount of energy consumed in the area, and is charged in a time zone with a small amount of energy consumed in the area.

13. The server device of claim 10, wherein the processor is configured to:
predict an amount of energy to be consumed and an amount of energy be generated in the area after the control time period; and
determine, based on the scheduling control information, the predicted amount of energy to be consumed, and the predicted amount of energy to be generated, whether to generate the real-time control information for controlling charging and discharging of the ESS.

14. The server device of claim 10, wherein the processor is configured to correct the scheduling control information so as to prevent reverse transmission of power from the area to the power backbone network by controlling, based on the corrected scheduling control information, the ESS.

15. The server device of claim 10, wherein the processor is configured to correct the scheduling control information so that the peak power load does not have a value greater than a preset value by controlling, based on the corrected scheduling control information, the ESS.

16. The server device of claim 10, wherein the processor is configured to distribute the corrected scheduling control information to the plurality of clients.

17. The server device of claim 10, wherein the processor is configured to settle, based on the energy information to which the corrected scheduling control information is reflected, a cost of power generated in the area with the plurality of clients.

* * * * *